(12) United States Patent
Dvoretzki et al.

(10) Patent No.: US 9,391,738 B2
(45) Date of Patent: Jul. 12, 2016

(54) SYSTEM AND METHOD FOR ACCELERATING A MAXIMUM LIKELIHOOD DECODER IN A MIMO SYSTEM

(71) Applicant: Ceva D.S.P. Ltd., Herzlia Pituach (IL)

(72) Inventors: Noam Dvoretzki, Hod HaSharon (IL); Zeev Kaplan, Karmiel (IL); Jeffrey Allan (Alon) Jacob (Yaakov), Raanana (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 0 days.

(21) Appl. No.: 14/168,397

(22) Filed: Jan. 30, 2014

(65) Prior Publication Data

US 2015/0155971 A1 Jun. 4, 2015

(30) Foreign Application Priority Data

Dec. 3, 2013 (EP) .................................... 13195548

(51) Int. Cl.
*H04L 27/06* (2006.01)
*H04L 1/00* (2006.01)
(Continued)

(52) U.S. Cl.
CPC ............ *H04L 1/0054* (2013.01); *H04B 7/0413* (2013.01); *H04B 7/0837* (2013.01); *H04L1/0047* (2013.01); *H04L 25/03242* (2013.01); *H04L 25/03891* (2013.01); *H04L 2025/03426* (2013.01)

(58) Field of Classification Search
CPC ............... H04L 2025/03426; H04L 25/03242; H04L 25/03216; H04L 2025/0342; H04L 25/067; H04L 1/005; H04L 25/03318; H04L 1/0054; H04L 25/03229; H04L 27/2647; H04L 25/03178; H04L 27/2601; H04L 25/03222; H04L 25/03891; H04L 25/03197; H04L 1/0052; H04L 1/0047; H04L 1/0055; H04L 25/0242; H04L 25/03191; H04L 1/20; H04B 7/0413; H04B 1/71057; H04B 7/08; H04B 7/0837; H04B 7/04; H03M 13/3784; H03M 13/41; H03M 13/3905; H03M 13/3955; H03M 13/6525

USPC ................ 375/341, 267, 262, 347, 299, 349; 714/794, 795, 780, 796, 792; 455/132, 455/101, 103; 341/79
See application file for complete search history.

(56) References Cited

U.S. PATENT DOCUMENTS 8,005,170 B2   8/2011   Lee et al.
8,018,828 B2   9/2011   Song et al.
(Continued)

FOREIGN PATENT DOCUMENTS

EP            2341676          7/2011
WO     WO 2009/109394 A2      9/2009
(Continued)

OTHER PUBLICATIONS

Burg et al. US "VLSI implementation of MUMO detection using sphere decoding algorithm";Jul. 2005, IEEE journal of solid state circuit, pp. 1566-1577.*

(Continued)

*Primary Examiner* — Rahel Guarino
(74) *Attorney, Agent, or Firm* — Pearl Cohen Zedek Latzer Baratz LLP

(57) ABSTRACT

A decoder to search a tree graph to decode a received signal. The tree graph may have a plurality of levels, each level having a plurality of nodes and each node representing a different value of an element of a candidate transmit signal corresponding to the received signal. The decoder may include a first module to execute a branch prediction at each branch node to select one of a plurality of candidate nodes stemming from the branch node that has a smallest distance increment, and a second module, running in parallel to the first module, to evaluate the branch prediction made by the first module at each branch node by computing an accumulated distance of the selected node. If the accumulated distance of the selected node is greater than or equal to a search radius, the first module may override the branch prediction and select an alternative candidate node.

20 Claims, 9 Drawing Sheets

(51) Int. Cl.
  *H04B 7/04* (2006.01)
  *H04B 7/08* (2006.01)
  *H04L 25/03* (2006.01)

(56) References Cited

U.S. PATENT DOCUMENTS

| | | | |
|---|---|---|---|
| 8,279,977 B2 | 10/2012 | Rayala | |
| 2005/0135498 A1 | 6/2005 | Yee | |
| 2009/0034664 A1 | 2/2009 | Masui et al. | |
| 2010/0014606 A1* | 1/2010 | Chen et al. | 375/262 |
| 2011/0044407 A1 | 2/2011 | Chang et al. | |
| 2012/0269303 A1* | 10/2012 | Paker et al. | 375/341 |

FOREIGN PATENT DOCUMENTS

| WO | WO 2010/005606 A1 | 1/2010 |
|---|---|---|
| WO | WO 2010/112506 | 10/2010 |

OTHER PUBLICATIONS

Blocskei H et al. "VLSI Implementation of MIMO Detection Using The Sphere Decoding Algorithm" IEEE Journal of Solid-State Circuits, IEEE Service Center, Piscataway, NJ, USA vol. 40, No. 7, Jul. 1, 2005; pp. 1566-1577.

Azzam et al., "Reduction of ML Decoding Complexity for MIMO Sphere Decoding, QOSTBC, and OSTBC", pp. 18-25, DOI: 10.1109/ITA.2008.4601014 "IEEE", In proceeding of: Information Theory and Applications Workshop, Feb. 2008.

Kozlowski et al., "Phased array antennas in MIMO receiver", Journal of Telecommunications and Information Technology, Jan. 2007, pp. 26-29.

3GPP Organizational Partners, "3rd Generation Partnership Project; Technical Specification Group Radio Access Network; Evolved Universal Terrestrial Radio Access (E-UTRA); Physical Channels and Modulation (Release 8)" May 2009, pp. 1-83.

\* cited by examiner

SYSTEM AND METHOD FOR ACCELERATING A MAXIMUM LIKELIHOOD DECODER IN A MIMO SYSTEM

RELATED APPLICATION DATA

The present application claims benefit from European Patent Application 13195548.6, filed Dec. 3, 2013, entitled "SYSTEM AND METHOD FOR ACCELERATING A MAXIMUM LIKELIHOOD DECODER IN A MIMO SYSTEM," incorporated by reference herein in its entirety.

FIELD OF THE INVENTION

The present invention relates generally to the field of radio frequency (RF) multiple-input-multiple-output (MIMO) systems and more particularly to decoding spatial multiplexed signals in MIMO systems.

BACKGROUND OF THE INVENTION

An N×M MIMO system 100 is shown in FIG. 1, which includes multiple M transmitting antennae 102 sending signals to multiple N receiving antennae 104. The M transmit antennae 102 may transmit over a channel data streams represented by a transmit vector $\bar{s}$ and received by the receiving antennae represented by a received vector $\bar{y}$. The relationship between the transmitted vector $\bar{s}$ and the received vector $\bar{y}$ defines the channel information, which may be represented by a channel matrix H as follows:

$$\bar{y} = H \cdot \bar{s} + \bar{n} \qquad (1)$$

The channel matrix H includes entries $h_{ij}$ that represent the relationship between the signals transmitted from the $j^{th}$ transmitter antenna 102 to the signal received by the $i^{th}$ receiver antenna 104. The dimension of the transmit vector $\bar{s}$ is M×1, the dimension of the received vector $\bar{y}$ is N×1, the dimension of the channel matrix H is N×M and $\bar{n}$ is a signal noise vector of dimension N×1 for N×M MIMO system 100.

A decoder 106, e.g., a maximum likelihood (ML) decoder, may decode a received signal $\bar{y}$ by determining its corresponding transmit signal $\bar{s}$ for a given channel matrix H. Each vector $\bar{s}$ may be a vector with a number of elements equal to the number of transmit antennae 102, M, and each vector $\bar{y}$ may be a vector with a number of elements equal to the number of receive antennae 104, N. In one example of a 4×4 MIMO channel matrix H (N=M=4), each vector $\bar{s}$ and $\bar{y}$ may be a 4-vector with 4 elements.

A demultiplexer 108 may modulate transmitted signals $\bar{s}$, for example, using quadrature amplitude modulation (QAM) mappers with 4, 16 or 64 QAM or any other type of modulation. Modulation may define a number of possible or candidate values for each vector element. For example, each element in 4 QAM or quadrature phase-shift keying (QPSK) has 4 possible values (e.g. defined by 2 bits—$2^2=4$ complex values (1,1), (−1,1), (−1,−1), (1,−1)), each element in 64 QAM has 64 possible values (e.g. 6 bits), etc. Decoder 106 may evaluate a total number of different transmit vectors $\bar{s}$ equal to the number of possible candidate modulation values to the power of the number of transmit antennae, M, to find the most likely solution for each received signal $\bar{y}$. For example, 64 QAM, using 4×4 MIMO there are $64^4$ (16.8 million) different candidate 4-vectors $\bar{s}$. A "tone" of data refers, e.g. in OFDM modulation, to the data transmitted/received over each frequency sub-carrier, which may be represented by all candidate transmit vectors $\bar{s}$ used to decode a single received signal $\bar{y}$. For example, the LTE advanced communication standard Cat.7 supports 12.6 million tones of data per second, or 12.6 million×16.8 million (211.68 trillion) candidate transmit vectors $\bar{s}$ to decode the signals $\bar{y}$ received during each second of communication.

Due to the enormous rate at which information may be decoded, there is a great need in the art for providing a system and method that accelerates decoding signals in MIMO systems.

SUMMARY OF EMBODIMENTS OF THE INVENTION

There is now provided according to embodiments of the invention an improved system and method that accelerates a maximum likelihood decoder in MIMO systems for effectively overcoming the aforementioned difficulties inherent in the art. Embodiments of the invention may provide near or full maximum likelihood performance at significantly faster speeds and/or with increased search complexity.

A decoder in a MIMO system to search a tree graph for a transmit signal $\bar{s}$ most likely to correspond to a received signal $\bar{y}$. The tree graph may have a plurality of levels, each level may have a plurality of nodes and each node may represent a different value of an element of the candidate transmit signal $\bar{s}$. The decoder may search the tree graph incrementally, progressing level-by-level along nodes forming a search path (e.g. starting at a root node at a zero-level node and ending at a leaf node at the final level). The decoder may compute an incremental metric at each node, a distance increment $DI_i$ or local distance measuring the distance between the received signal $\bar{y}$ and the transmit signal $\bar{s}$ variables represented by that ith-level node. The decoder may include a first module to execute a branch prediction at each branching node of the tree graph to select one of a plurality of candidate nodes stemming from the branch node that has a smallest distance increment (local distance) between the received signal $\bar{y}$ and the transmit signal $\bar{s}$ represented by the candidate node. The decoder may include a second module, running in parallel to the first module, to evaluate the branch prediction made by the first module at each branching node by computing an accumulated partial distance $PED_i$ or global distance of the selected node accumulating the distance increments computed at each node along a search path from a root node to the selected node. If the global distance of the selected node is less than a search radius, the branch prediction is correct and the first module may proceed. If the accumulated partial distance (global distance) of the selected node is greater than or equal to a search radius, the second module may command the first module to override the branch prediction and select an alternative one of the plurality of candidate nodes that has a next smallest distance increment.

The decoder may include a first module to iteratively predict a branch decision at each node along a decision path, wherein in each sequential cycle, the decoder may advance to select a new predicted node. The decoder may include a second module separate from the first module and operating in parallel to the first module. The second module may determine if the predicted branch selected by the first module in a previous clock cycle is correct or incorrect. If the branch decision is correct, the second module does not interrupt the first module and if the branch decision is incorrect, the second module may interrupt the first module to backtrack one cycle and select an alternative predicted node.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
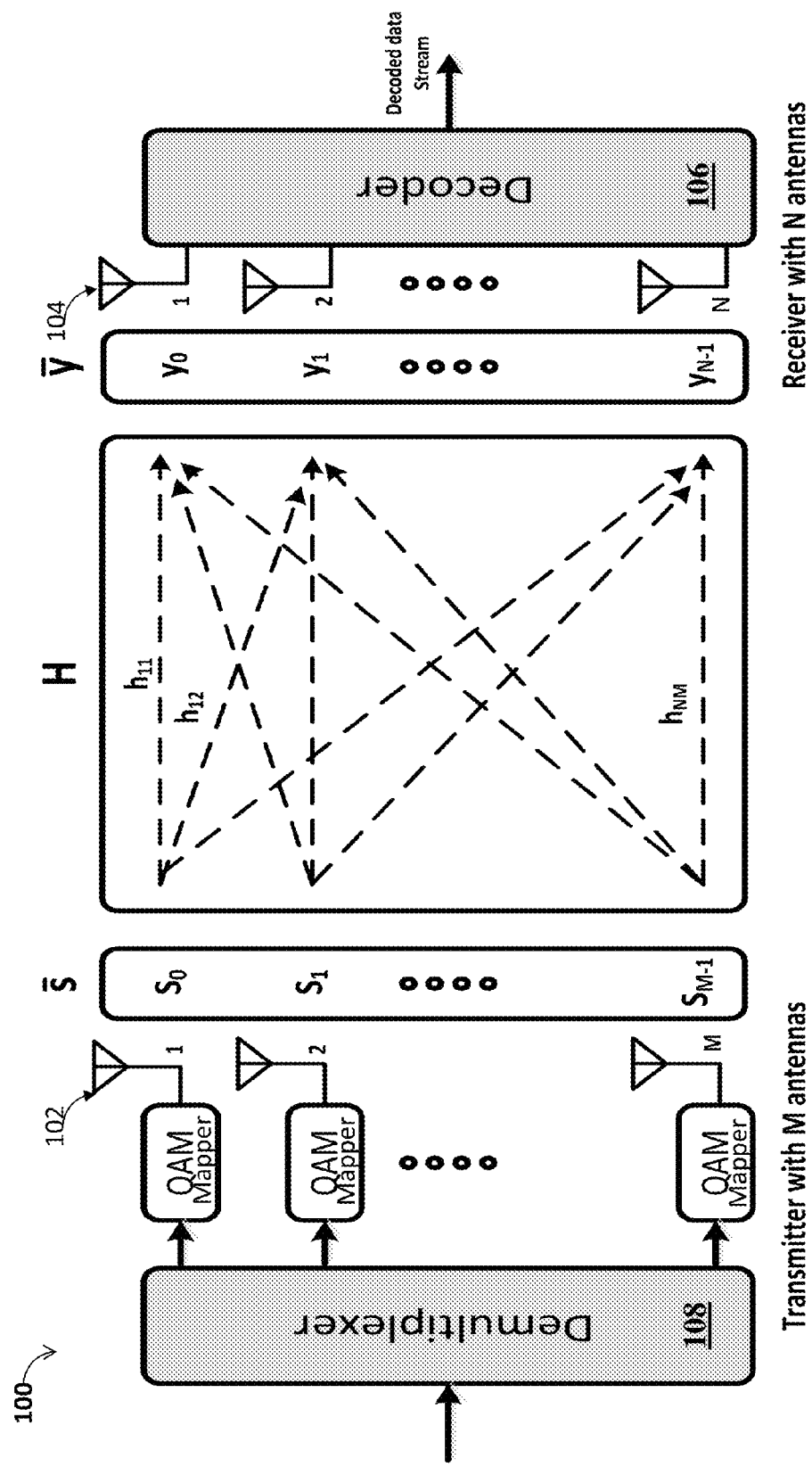
FIG. 1 is a schematic illustration of a N×M MIMO system in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices A maximum likelihood decoder (e.g. decoder 106 of FIG. 1) may decode each received signal $\bar{y}$ by searching a tree graph for corresponding source signals $\bar{s}$ for a given channel matrix H. Each tree graph may represent all possible or candidate transmit vectors $\bar{s}$ for a single received signal $\bar{y}$, i.e., one tone of data.

Figure 2:
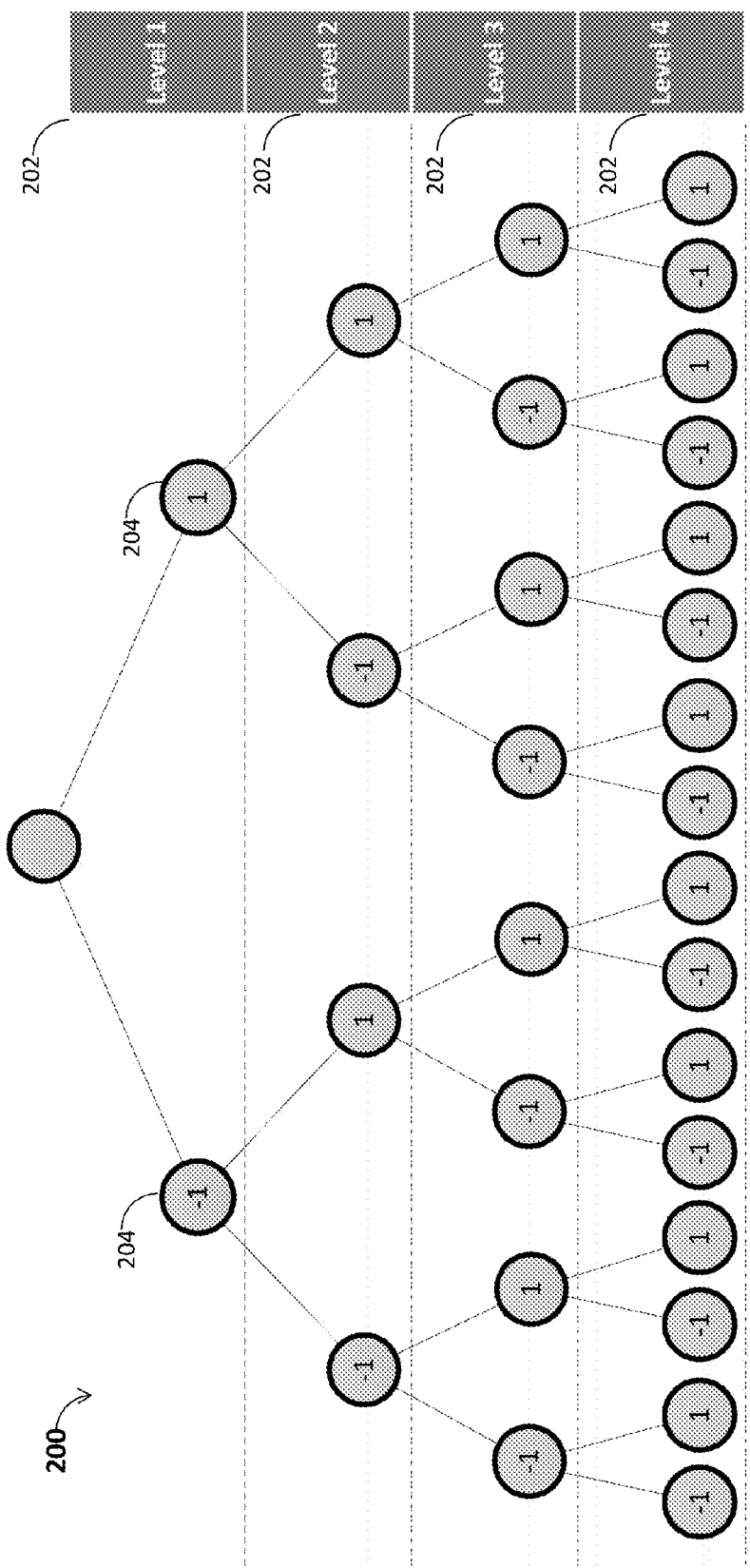
FIG. 2 is a schematic illustration of a tree graph used to decode a received signal $\bar{y}$ modulated in BPSK in a 4×4 MIMO system in accordance with an embodiment of the invention.

A tree graph 200 is shown in FIG. 2. Tree graph 200 may be organized into a plurality of levels 202, each level 202 including a plurality of nodes 204 (e.g. junctions). Each level 202 may define a different candidate transmit vector $\bar{s}$ element and each node 204 in that level may define the different candidate values for that transmit vector $\bar{s}$ element. The number of levels 202, M, in a tree graph 200 may be equal to the number of different transmit antennae 102 in FIG. 1 (e.g. M levels in an N×M MIMO system) and each parent node 204 in an i−1th level 202 of tree graph 200 (where i is an integer between 1 and M) splits into a number candidate values, $P_i$, of child nodes 204 in the ith level 202 of tree graph 200 equal to the modulation number (e.g., P=64 for 64 QAM, P=4 for QPSK). Accordingly the total number of nodes 204 (and associated candidate transmit vectors $\bar{s}$) in tree graph 200 is equal to the total number of candidate nodes in the tree: $\Pi_1^M P_i$. For example, a tree graph for a 4×4 MIMO system that includes 4 levels, where each level has 64 nodes representing 64 possible values of each of the 4 element of $\bar{s}$ has a total of 64^4 (16.8 million) candidate transmit vectors $\bar{s}$ for a single $\bar{y}$ vector. The tree graph shown in FIG. 2 has M=4 levels with a BPSK modulation value of P=2 (represented by 1 bits having 2^1=2 candidate values 1 and −1 per branch decision), although any integer number of M levels and any modulation number, P, may be used.

The maximum likelihood decoder may search tree graph 200 to determine the most likely solution e.g., a node 204 representing one element in a transmit vector $\bar{s}$ associated with a minimum difference or distance in equation (1) between H·$\bar{s}$ and the received vector $\bar{y}$ for that tree level 202, e.g., $\min_{\bar{s}} \|\bar{y} - H \cdot \bar{s}\|^2$. However, computing such distances for the trillions of possible solutions per second supported by wireless communications standards, such as, LTE advanced, is difficult.

QR decomposition may simplify the search distance computation by enabling incremental searches on the tree as opposed to evaluating the transmit vector $\bar{s}$ distance along the full tree path. Search distances may be derived, for example, according to equation (1), as $$\bar{y} = [\underline{h_1} \ \ldots \ \underline{h_M}] \begin{bmatrix} s_1 \\ \vdots \\ s_M \end{bmatrix} + \bar{n}.$$

Using QR decomposition, the channel matrix H is decomposed into matrices Q and R, such that: $=Q_{N \times M} R_{M \times N}$. Matrix Q is unitary such that: $Q^{-1}=Q^H (Q^H Q = I)$ and matrix R is an upper triangular matrix (e.g. having real entries along its main diagonal):

$$\begin{bmatrix} r_{11} & \cdots & r_{1n} \\ 0 & r_{22} & r_{2n} \\ \vdots & \ddots & \vdots \\ 0 & 0 & r_{nn} \end{bmatrix}$$

From equation (1), $$\bar{y} = H\bar{s} + \bar{n};\ Q^H \bar{y} = Q^H Q R \bar{s} + Q^H \bar{n} : \underbrace{Q^H \bar{y}}_{\tilde{y}} = R\bar{s} + \underbrace{Q^H \bar{n}}_{\tilde{n}},$$

where $\tilde{n}$ has the same statistics (e.g. the same covariance matrix $E[\tilde{n}^H \tilde{n}]$) as $\bar{n}$. According to this QR decomposition, conventional sphere decoder distance $\operatorname{argmin}_s \|\bar{y} - H\bar{s}\|^2$ may be translated to an equivalent, though simplified form, $\operatorname{argmin}_s \|\bar{y} - R\bar{s}\|^2$, to minimize the cost function of the squared distance as follows:

$$\operatorname{argmin}_s \|\bar{y} - H\bar{s}\|^2 \underset{eq.}{\Leftrightarrow} \operatorname{argmin}_s \|\bar{y} - R\bar{s}\|^2$$

Since matrix R is an upper triangular matrix, computing the squared distance ($\|\bar{y} - H\bar{s}\|^2$), e.g. used for the distance increment measurement, may be reduced from a multi-dimensional problem using the channel matrix H to lower-dimensional problems using matrix R.

To limit the number of candidate nodes and their distances to compute, a "sphere" decoder may be used, which searches tree graph 200 for a subset of nodes 204 that have an accumulated distance within a sphere of radius r centered at the received vector $\bar{y}$. The sphere decoder may select all nodes 204 with an accumulated distance within the sphere and may "prune" or discard all nodes 204 outside of the sphere.

The accumulated distance over the full tree search path may be, for example:

$$PED \equiv \operatorname{metric}(\bar{s}) = \|\bar{y} - R\bar{s}\|^2 = \sum_{i=0}^{Mt-1} m_i$$

The accumulated distance may be calculated in a recursive manner for a j-th level path (from a root node to a j-th level node) based on sequential $PED_i$'s for $i=0, \ldots j$, for example, solving each row of the matrix R, from the last row of R upwards to the first row of R as follows:

$$m_{M-1} = (y_{M-1} - r_{M-1,M-1} s_{M-1})^2$$
$$m_{M-2} = (y_{M-2} - r_{M-2,M-2} s_{M-2} - r_{M-1,M-2} \hat{s}_{M-1})^2, \text{ using } \hat{s}_{M-1}$$
$$\vdots$$
$$m_1 = (y_1 - r_{1,1} s_1 - r_{1,2} \hat{s}_2 - r_{1,3} \hat{s}_3 \ldots - r_{1,M-1} \hat{s}_{M-1})^2,$$
$$\text{using } \hat{s}_2, \hat{s}_3, \ldots, \hat{s}_{M-1}$$
$$m_0 = (y_0 - r_{0,0} s_0 - r_{0,1} \hat{s}_1 - r_{0,2} \hat{s}_2 \ldots - r_{0,M-1} \hat{s}_{M-1})^2,$$
$$\text{using } \hat{s}_1, \hat{s}_2, \hat{s}_3, \ldots, \hat{s}_{M-1}$$

An ith-level node may have an accumulated distance from the root node to the branch node equal to a partial Euclidean distance ($PED_i$). The distance increment from that ith-level node to the next i+1-level node is $DI_i$. Partial Euclidean distance, $PED_i$, and distance increment, $DI_i$, may be computed, for example, as:

$$PED_i(\hat{s}_i, \hat{s}_{i+1}, \hat{s}_{M-1}) = \sum_{j=i}^{Mt-1} m_j, \quad DI_i = m_i = \underbrace{\left( y_i - \sum_{j=i-1}^{M-1} r_{ij} s_j - r_{ii} s_i \right)^2}_{py_{ii}}$$

where $py_{ii}$ is a function of ith-level measurement of the current level and other levels $i=0, \ldots, M-1$. This internal state variable, $py_{ii}$, may be generated in a recursive manner, for example, as described in reference to $PED_i$. The accumulated distance for each sequential branch decision $PED_{i-1}$ may be the sum of the previous level i accumulated distance $PED_i$ and the distance increment $DI_i$ from the branch node to the selected node of the next level i−1, for example, defined as:

$$PED_{i-1}(\hat{s}_{i-1}, \hat{s}_i, \hat{s}_{M-1}) = PED_i(\hat{s}_i, \hat{s}_{i+1}, \hat{s}_{M-1}) + DI_i$$

Accordingly, a node 204 in a jth tree level 202 may have an accumulated distance, for example, equal to $PED \equiv \|\bar{y} - R\bar{s}\|^2 = \sum_{j=i}^{M_t} m_i$.

The sum of the two terms, $PED_i$ and $DI_i$, may be computed directly (e.g. exactly) or may be approximated to reduce the complexity of the computing hardware and speed up the computation, for example, by using $L_1$, $L_2$ and/or $L_\infty$ vector norm recursive calculations as are known in the art. Example solutions for summing terms $PED_i$ and $DI_i$ include:

Using $L_\infty/L_1$ norms instead of $L_2$ norm.
Using $L_2$ approximation, e.g.

$$\left\| \begin{bmatrix} x \\ y \end{bmatrix} \right\| = \sqrt{x^2 + y^2} \approx \alpha \cdot \min(|x|, |y|) + \beta \cdot \max(|x|, |y|).$$

$L_2$ computations using least square approximations may be implemented with shift and addition hardware components and therefore may be relatively simple (e.g. using fewer and less specialized hardware components) as compared to other methods.

A search path including a node 204 may be determined to be "inside" a sphere of radius r when the accumulated distance $d^2(\bar{s})$ of its associated transmit vector $\bar{s}$ (e.g. the PED of a full path from a root node to a leaf node), is less than r and may be determined to be "outside" the sphere when $d^2(\bar{s})$ is greater than or equal to r. If no paths are found within the sphere, the sphere decoder may increase the radius r until a path is found. When a new path is found within the search sphere, the radius of the sphere may be reduced to the new smaller accumulated distance. This smaller distance may be set as a new sphere radius r* and the sphere decoder may repeat its search within the new smaller sphere of radius r*. The sphere decoder repeats this process iteratively until a search path associated with the smallest accumulated distance is detected. The sphere decoder correlates the transmit vector $\bar{s}$ represented by that path with the received vector $\bar{y}$.

A conventional branch decision may determine whether or not the decoder selects or prunes a node 204 by (1) calculating the accumulated distance of its search path through the tree and (2) comparing the accumulated distance to the search radius. In order to choose the correct node 204 in tree graph 200, conventional decoders execute both steps (1) and (2), in sequence, using for example 2 clock cycles per node 204 or one cycle at half the cycle frequency (e.g. twice the period of time per cycle). Since conventional systems cannot proceed to a subsequent (i+1-level) node 204 without validating the choice of a previous (i-level) node 204 (every branch decision is dependent on a previous level branch decision), conventional decoders must search a tree graph sequentially, thereby limiting the speed of the decoder.

In accordance with embodiments of the invention, there is provided a decoder designed to mitigate the inherent sequential nature of conventional decoders to parallelize the branch decision steps (1) and the confirmation step (2) to confirm that decision by comparing the accumulated distance with the radius. In accordance with such embodiments, a decoder may execute a branch decision by predicting or "guessing" the correct node without waiting for the confirmation step (2), thereby using only a single clock cycle. In the branch decision step (1), the decoder measure only the distance increment, $DI_i$ (e.g. the "local" distance) of each of the plurality of P candidate nodes between the P branches and the received vector $\overline{y}$, orders the nodes from smallest to largest distance increment, and selects the node with the minimum distance increment. The decoder proceeds to search the tree graph based on the assumption that the selected node with the minimum distance increment is correct, though this assumption is unconfirmed by step (2) at the time of the branch decision (the minimum distance increment node may be incorrect if it contributes to an overall global or accumulated partial distance, $PED_i$, that is greater than the search radius r). The confirmation step (2) is executed in a subsequent parallelized process (independent and/or non-sequential from branch decision step (1) process) to compute the accumulated partial distance of the selected node's search path and compare it to the radius r to determine if the branch decision of step (1) is correct or false. Accordingly, two processes may run in parallel: a branch decision process selecting a smallest node based only on the distance increment of the node—step (1)—and a separate parallel confirmation process evaluating the prediction based on the global or accumulated partial distance of the path of the selected node—step (2).

By separating steps (1) and (2) into parallel processes, the branch decision process (1) may proceed along the tree graph making one-cycle branch decisions (instead of the conventional two-cycle decisions). Note, the confirmation process is typically one cycle behind the branch decision process since step (2) uses the selected smallest distance increment node output from step (1) to determine its accuracy (the branch decision process may select an ith-level node while the confirmation process evaluates the previous i−1-level node).

If the confirmation process determines that the branch decision prediction is correct (e.g. the accumulated partial distance of the tree path to the selected node is less than the tree radius), the branch decision process proceeds uninterrupted in only a single cycle, thereby saving a clock cycle and doubling the search decoder speed as compared to conventional two-cycle branch decisions. However, if the branch decision guess is false (e.g. the accumulated partial distance is greater than the tree radius), the decoder may discard the result and start over by selecting the next smallest ordered node, thereby incurring a clock cycle penalty.

Figure 7:
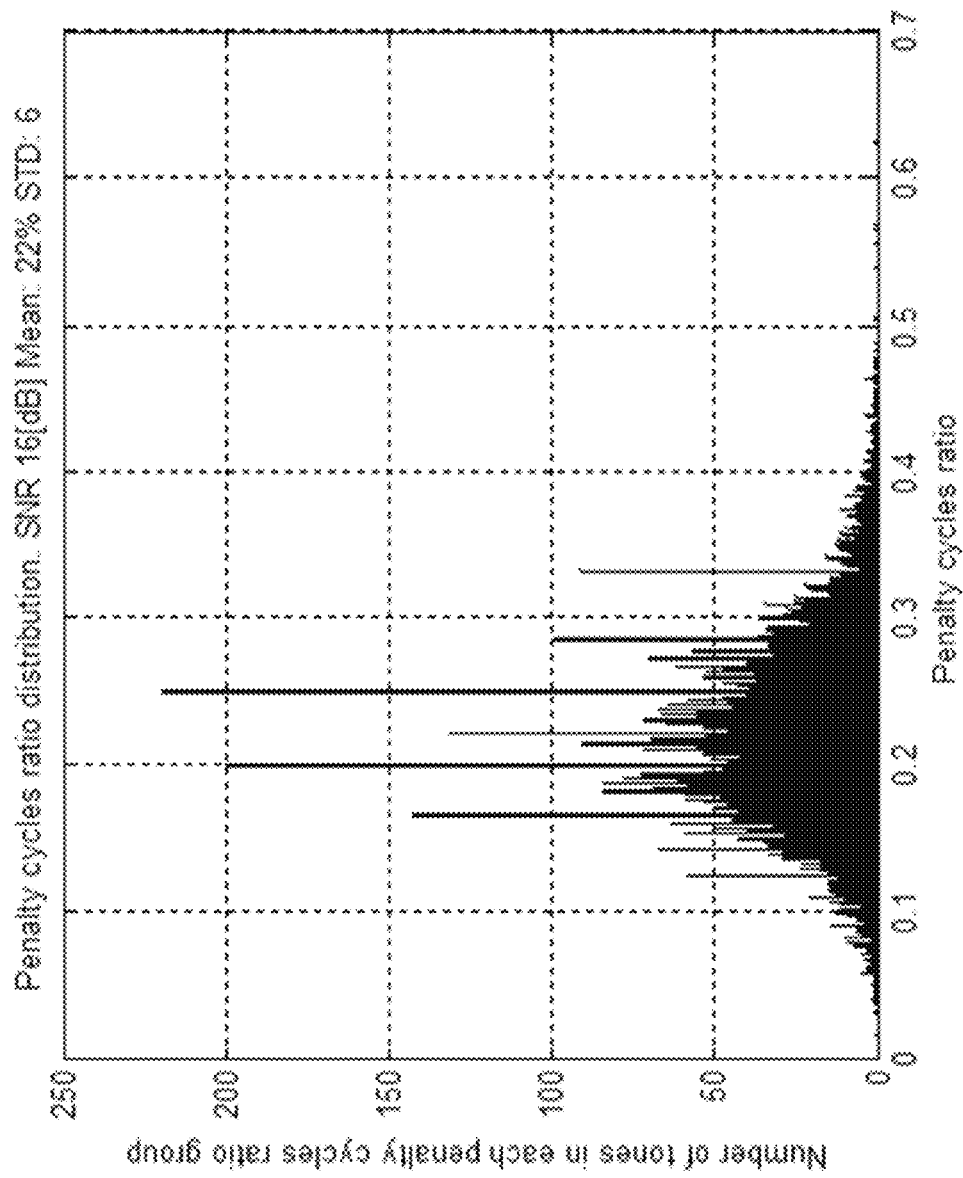
FIGS. 7 and 8 are graphs of experimental results of an example 4×4 MIMO decoder using 64 QAM in an LTE advanced communication system to process data in a low-medium SNR range and a high SNR range, respectively, operating in accordance with an embodiment of the invention.
Figure 8:
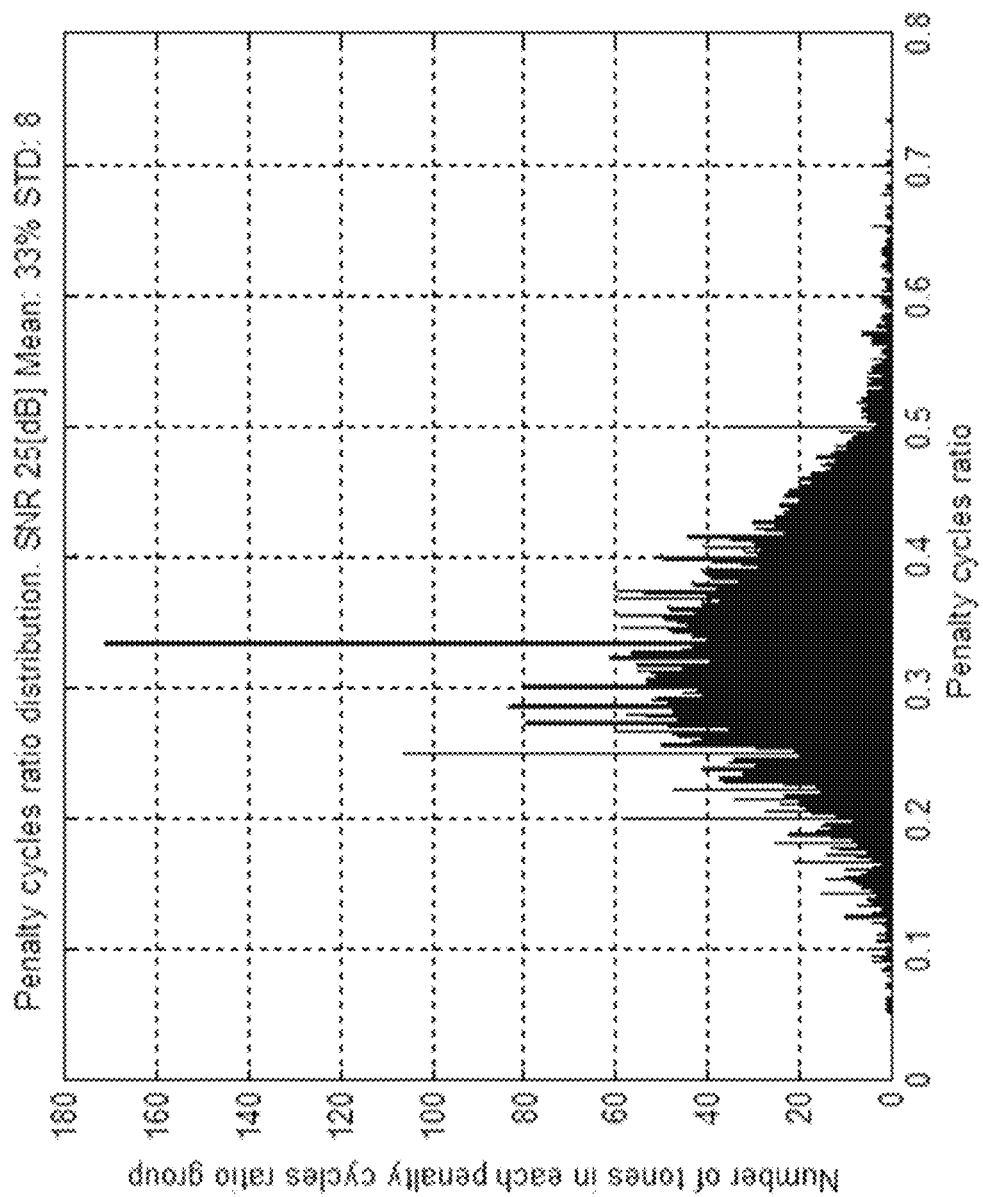

In some embodiments of the invention, branch decisions predictions based only on local distances increments—step (1)—may be used to search tree graphs that are "biased" or that satisfy a bias condition e.g., where one of the P candidate nodes for a branch decision is statistically more likely or probable to be correct than the others. In one embodiment, a bias condition may occur when there is a priori knowledge predefining a branch preference or bias of one node over another. For example, in communications, transmissions include forward error correction bits defining certain rules for the data. Since it is more likely that the transmitted data is correct than false, the decoder may proceed to pick a node that satisfies the rules of the forward error correction bits. In one embodiment, the decoder may test for the presence of bias conditions in real-time and based thereon may activate or deactivate parallelized predicted branch decisions according to embodiments of the invention. The more biased a tree graph or branch, the more likely its outcome will be known and the greater the rate of success and decoder speed. For example, FIGS. 7 and 8 show experimental results in which a 4×4 MIMO decoder uses 64 QAM in an LTE advanced communication system to process 12,000 tones of data and increased the decoder speed, on average, by 39% for relatively low-medium SNR range data (e.g. 15-20 dB) and 33.5% for relatively high SNR range data (25-30 dB), respectively.

Figure 3:
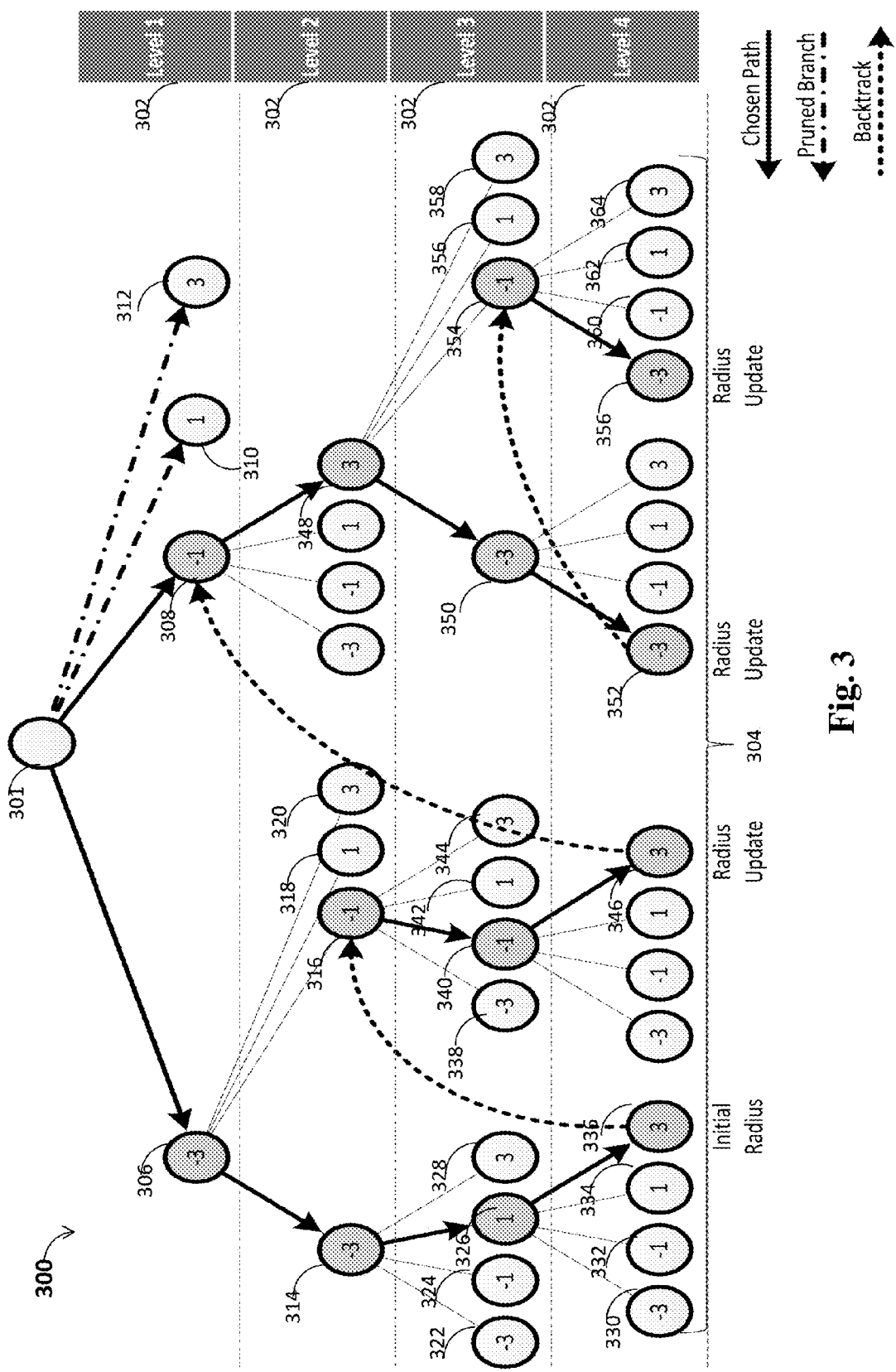
FIG. 3 is a schematic illustration of a tree graph used to decode a received signal $\bar{y}$ modulated in QPSK in a 4×4 MIMO system in accordance with an embodiment of the invention.

Reference is made to FIG. 3, which schematically illustrates a tree graph decoded by a decoder (e.g., decoder 500 of FIG. 5) operating according to embodiments of the invention. The decoder may be a maximum likelihood sphere decoder with an accelerator in accordance with an embodiment of the invention. Tree graph 300 shown in FIG. 3 has M=4 levels 302 and each node branches into P=4 candidate nodes (e.g. defined by a QPSK modulation value represented by 2 bits having $2^2=4$ complex values (1,1), (−1,1), (−1,−1), (1,−1) per branch decision), although any integer number of M levels and any number of candidate nodes, P, may be used.

The decoder may initialize a decoding process at "root" node 301 (level zero) and may iteratively execute a branch decision prediction at each shaded node 304 along a branch decision path. In each sequential cycle, the decoder may advance to execute a branch decision prediction at a new node 304 in a subsequent level 302. For each branch decision, decoder may select a node based only on the minimum distance increment $DI_i$ (e.g. local distance). In parallel (at a one cycle time delay), a validation or confirmation process may determine if the branch decision predicting the node 304 made in a previous cycle is correct, e.g., if the branch has a path with an overall accumulated distance $PED_i$ (e.g. global distance) smaller than the search radius r. When the branch decision is correct, the decoder is not interrupted, enabling the decoder to make branch decisions twice as fast as conventional decoders. However, when the branch decision is incorrect, e.g., if $PED_i$ is greater than or equal to r, the decoder may be interrupted and may return to a previous level to select an alternative candidate node, thereby losing a cycle.

In an initial $1^{st}$ clock cycle, the decoder may execute a level (1) branch decision starting at root node 301 by measuring the distance increment of each of the plurality of candidate nodes 306-312 in level (1) from root node 301, ordering candidate nodes 306-312 according to their associated distances from the smallest to largest distance increments, $DI_i$, and selecting the node 306 associated with the smallest distance increment $DI_i$.

In the next $2^{nd}$ clock cycle, the decoder may execute a level (2) branch decision by measuring the distance increment of each of the plurality of candidate level (2) nodes 314-320 stemming from the level (1) node 306 selected in the previous cycle, ordering candidate nodes 314-320 from smallest to largest distance increment, and selecting the node 314 associated with the smallest distance increment.

In the next $3^{rd}$ clock cycle, the decoder may execute a level (3) branch decision by measuring the distance increment of each level (3) candidate node 322-328 stemming from selected level (2) node 314, ordering level (3) candidate nodes 322-328 from smallest to largest distance increment, and selecting the node 326 with the smallest distance increment.

In the next $4^{th}$ clock cycle, the decoder may execute a level (4) branch decision by measuring the distance increment of each level (4) candidate node 330-336 stemming from selected level (3) node 326, ordering level (4) candidate nodes 330-336 from smallest to largest distance increment, and selecting the node 336 with the smallest distance increment. Node 336 may be referred to as a "leaf" node since it is in the final level (4). This accumulated distance from root node 301 to the first selected leaf (level (4)) node 336 may be set as the initial search radius r value of the sphere decoder.

After the search radius r is initialized, the decoder may continue searching tree graph 300 by concurrently or in parallel executing an ith level branch decision process and an i−1th level confirmation process. The decoder may only return to nodes in a path having an accumulated distance less than the search radius. Nodes in a path having an accumulated distance greater than or equal to the search radius r may be pruned. (Nodes marked in FIG. 3 with shading have been selected; unmarked nodes in FIG. 3 with no shading have not been selected, either because they are not yet a candidate for selection or because they were a candidate for selection but were pruned.)

In the next $5^{th}$ clock cycle, the decoder may return to node 316 having the next smallest distance increment of the candidate nodes 314-320. The decoder may execute in parallel a level (3) branch decision to evaluate candidate nodes 338-344 stemming from node 316. For the node 316 decision, the decoder may select node 340 as having the smallest distance increment. For the confirmation process, the decoder may compare the accumulated distance of the path of node 316 (e.g. from root node 301 to candidate node 316)) to the radius r (e.g. from node branch 301 to leaf node 336). In the example shown in the figure, the node 316 decision is confirmed to be correct and both parallel processes may proceed to the next level.

In the next $6^{th}$ clock cycle, the decoder may execute in parallel a level (4) branch decision to select node 346 and a level (3) confirmation process to confirm that node 340 is correct.

In the next $7^{th}$ clock cycle, the decoder may confirm that the accumulated distance of the path of node 346 is smaller than the radius r and update the radius r to be the smaller accumulated distance. In parallel, the decoder may proceed to the next available highest-level node 308 to select level (2) candidate node 348 (The decoder may skip nodes 318 and 320, which are pruned since each of their accumulated distances are greater than the search radius).

In the next $8^{th}$ clock cycle, the decoder may, in parallel, confirm that level (2) node 348 is correct and select a level (3) node 350.

In the next $9^{th}$ clock cycle, the decoder may, in parallel, confirm that level (3) node 350 is correct and select a level (3) node 352.

In the next $10^{th}$ clock cycle, the decoder may confirm that level (4) node 352 is correct and update the radius r to be the accumulated distance of the path thereof (from root node 301 to leaf node 352). In parallel, the decoder may proceed to a next available level (3) node 354 (having the second smallest distance increment among nodes 350-358) and select node 356 with the smallest distance increment among candidate nodes 356-364.

In the next $11^{th}$ clock cycle, the decoder may confirm that the accumulated path distance of the level (4) leaf node 356 is smaller than the radius r and may update the radius r to be the accumulated distance. (No parallel branch decision is made in this final clock cycle since all branches in tree graph 300 have been traversed.)

It may be appreciates that although the discussion in reference to FIG. 3 refers to levels 1-4, nodes 301-364 and clock cycles 1-11, this discussion may be generalized to any integer numbers of levels, nodes and clock cycles. Similarly, the discussion of a $1^{st}$, $2^{nd}$, $3^{rd}$, ... level or cycle may equivalently refer to a $i^{th}$, $i+1^{th}$, $i+2^{th}$, ... level or cycle.

Figure 4A:
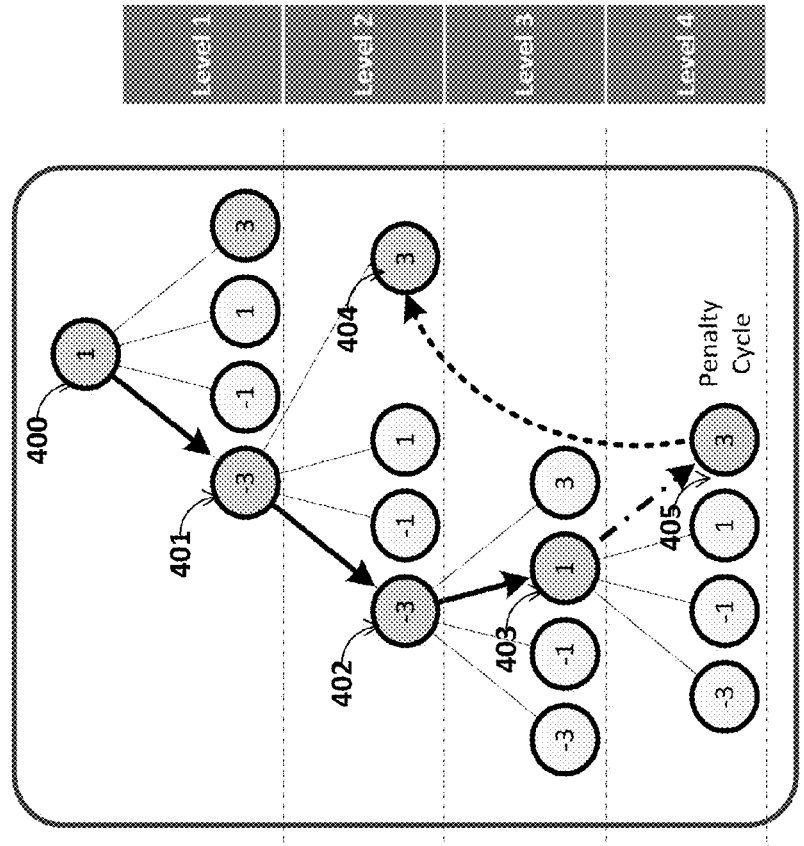
FIGS. 4A and 4B are schematically illustrates the same tree graph decoded by a decoder not using an accelerator (FIG. 4A) and using an accelerator (FIG. 4B) operating according to an embodiment of the invention
Figure 4B:
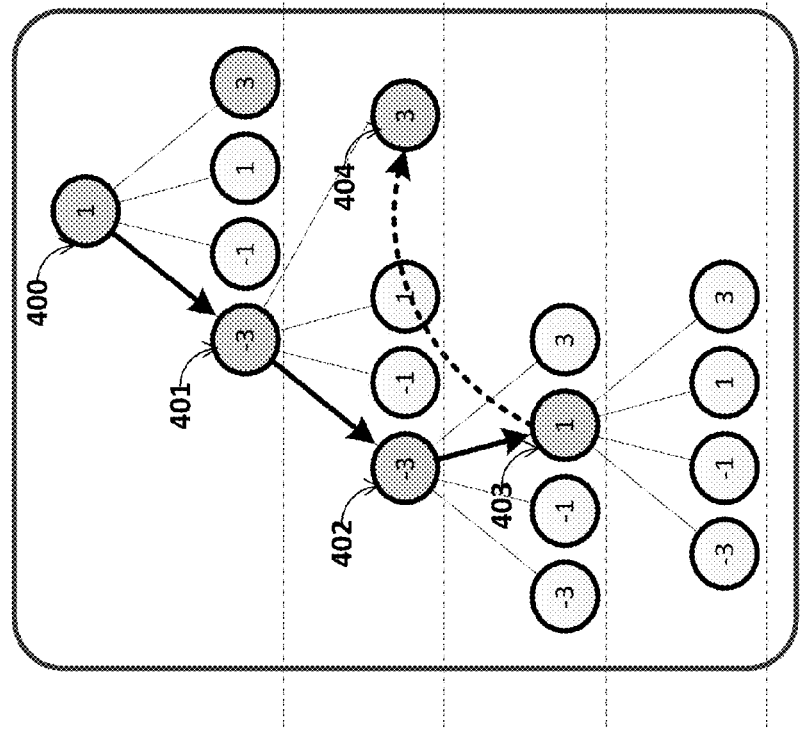

Reference is made to FIGS. 4A and 4B, which schematically illustrates the same tree graph decoded by a decoder not using an accelerator (FIG. 4A) and using an accelerator (FIG. 4B) operating according to an embodiment of the invention. The decoder (e.g. decoder 400 of FIG. 4) may be a maximum likelihood sphere decoder.

In FIG. 4A, a decoder traverses the tree graph by selecting one of a plurality of candidate nodes at each branch junction. For each candidate node, the decoder may compute the accumulated distance for the node's path and compare it to the search radius. If the search radius is greater than or equal to the accumulated distance for the node, the node is verified and the decoder proceeds to select the node in the next tree level, as shown for nodes 400-402. However, if the search radius is less than the accumulated distance for the node, the node is pruned or discarded, as shown for node 403, and the decoder proceeds to the next available one of the plurality of candidate nodes 404.

In FIG. 4B, a decoder traverses the tree graph by selecting a candidate node having the smallest distance increment (local distance), and proceeding to the next level-branch decision without verifying the previous branch decision. In parallel, e.g. at a one cycle time delay, the decoder may compute the accumulated distance (global distance) of the path of the selected node and compare it to the search radius. If the search radius is greater than or equal to the accumulated distance for the node (as shown for branch decisions 400-402), the node is verified and the decoder proceeds at an acceleration of twice the speed of the decoder in FIG. 4A. However, if the search radius is less than the accumulated distance for the node (as shown for branch decision 403), the decoder proceeds along an incorrect path selecting node 405 until it determines, e.g., at a one cycle time delay, that the branch decision 403 and thus 405 are incorrect. Once branch decision 403 is evaluated as incorrect, the decoder backtracks to select node 404. The decoder incurs a penalty cycle for each incorrect branch decision as compared to correct branch decisions.

Figure 5:
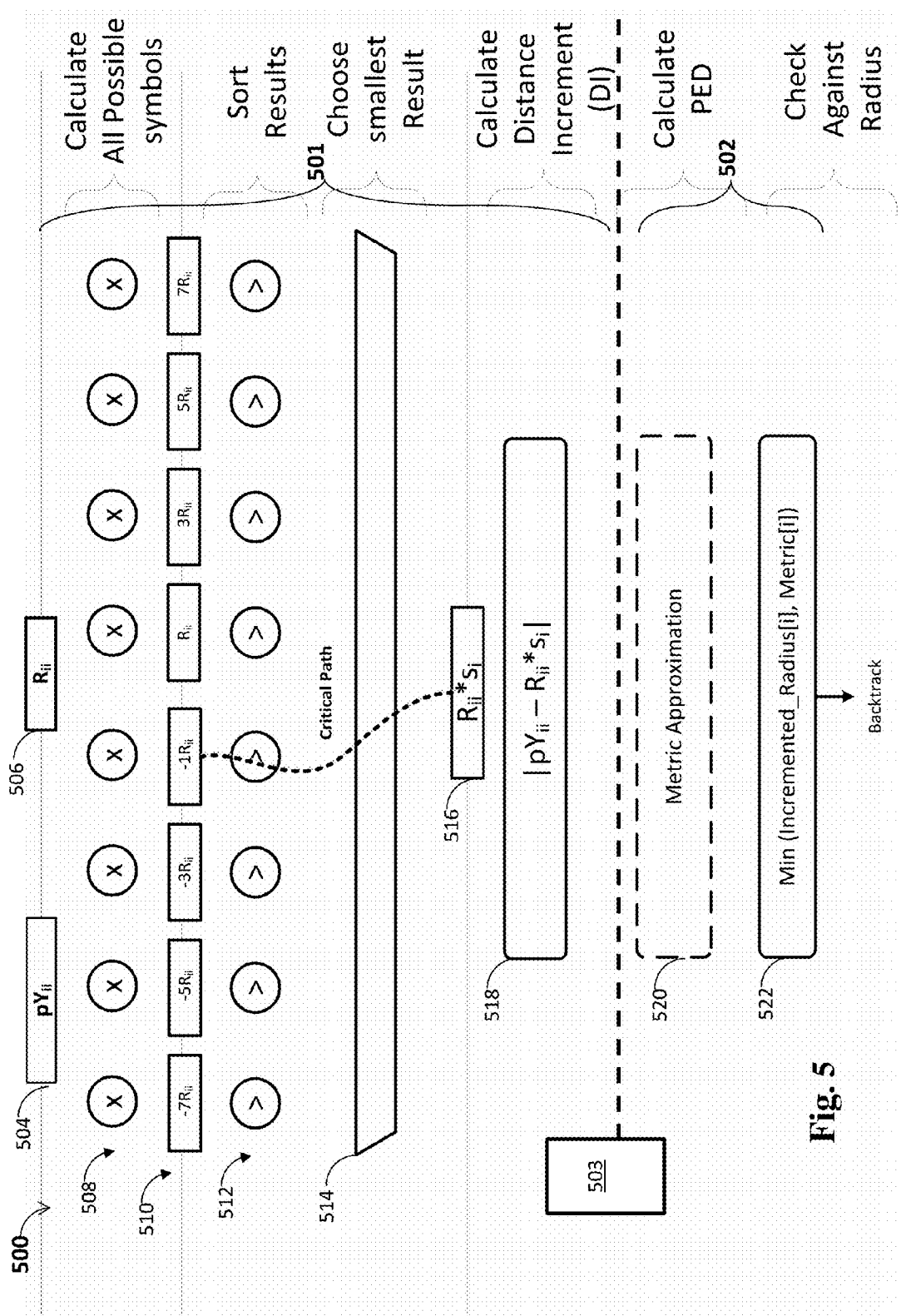
FIG. 5 is a schematic illustration of a decoder using an accelerator operating in accordance with an embodiment of the invention.

Reference is made to FIG. 5, which schematically illustrates a decoder 500 using an accelerator according to embodiments of the invention.

Decoder 500 may include two or more separate independently operated processes executed by a branch decision module 501 and a confirmation module 502. Both modules 501 and 502 may run in parallel, for example, with module 502 running at a time delay of, for example, one (1) cycle, from module 501.

Branch decision module 501 may include modules 506-518 operating in a single cycle to select the most probable (smallest local distance increment) one of a plurality of P candidate nodes stemming from the same parent node and module 502 may include modules 520-522 to compute the accumulated or global distance of the path of the node selected by module 501 and determine if it is correct (smaller than a search radius).

A buffer 504 may store an internal state variable $py_{ii}$ and a buffer 506 may store internal state variable $R_{ii}$ for an ith level branch decision. This state variable is calculated recursively to simplify the current level $PED_i$ (partial Euclidean distance) calculation.

A module 508 may compute a plurality of P candidate transmit signal vector $\bar{s}i$ for the P modulation values and a module 510 may compute the product $Rii\bar{s}i$ for each of those P candidate node values.

A module 516 may calculate the product signals $Rii\bar{s}i$ and module 518 may calculate the distance increment, $DI_i$ of each of the P candidate nodes. A module 512 may receive the distance increment, $DI_i$ of each of the P candidate nodes and order them according to the smallest to largest distance increments, $DI_i$. This distance measures each candidate node's local (non-accumulated) distance.

A module 514 may update a branch decision to select the candidate node with the smallest distance increment and proceed to the next tree level based on that branch decision.

Module 514 may proceed either down the tree graph (if the current node is in a level 1, ..., M−1) or up the tree graph (if the current node is a leaf node in the last level M).

After modules 508-518 make a branch decision for a current ith level node (in one clock cycle), module 501 may increment index i to the index of the next tree level and reset modules 508-518 to iterate their operations for the next level branch decision.

In parallel to module 501 executing an iteration of a branch decision, confirmation module 502 may evaluate if a previous iteration of a branch decision is correct.

A module 520 may determine a metric approximation of the accumulated distance, e.g., $PED \equiv \|\bar{y} - Rs\|^2 = \Sigma m_i$, of the tree path of the node corresponding to transmit vector $\bar{s}$ and module 520 may compare the metric approximation to a search radius. If module 522 determines that the metric approximation is the minimum value, the selected node is correct and decoder 501 may proceed uninterrupted. Modules 520-522 may proceed to evaluate the next iteration node selected by module 501. In addition, if the confirmed node is a leaf node, module 522 may update the most recently used accumulated distance $py_{ii}$ in buffer 504 with the current iteration's accumulated distance. If however module 522 determines that the search radius is the minimum, the selected node is incorrect and decoder 502 may interrupt or override module 501 to command module 512 to backtrack to the next available (non-pruned) higher-level branch decision.

According to embodiments in which decoder 500 may activate and deactivate parallelized branch decisions, decoder 500 may switch between parallelized processes by executing modules 501 and 502 in parallel and non-parallelized processes by executing modules 501 and 502 in sequence.

Modules 501, 502 and 508-522 may be software-implemented using dedicated instruction(s) or, alternatively, hardware-implemented using designated hardware or circuitry, such as, logic arrays (e.g. shift, addition, arithmetic logic units (ALUs)), controllers and/or processors. Memory 503 may store resources (e.g. channel matrix H, upper triangular matrix R, current or past values for Rii, $py_{ii}$, the sphere radius r, etc.) and instructions for executing processes according to embodiment of the invention.

Figure 6:
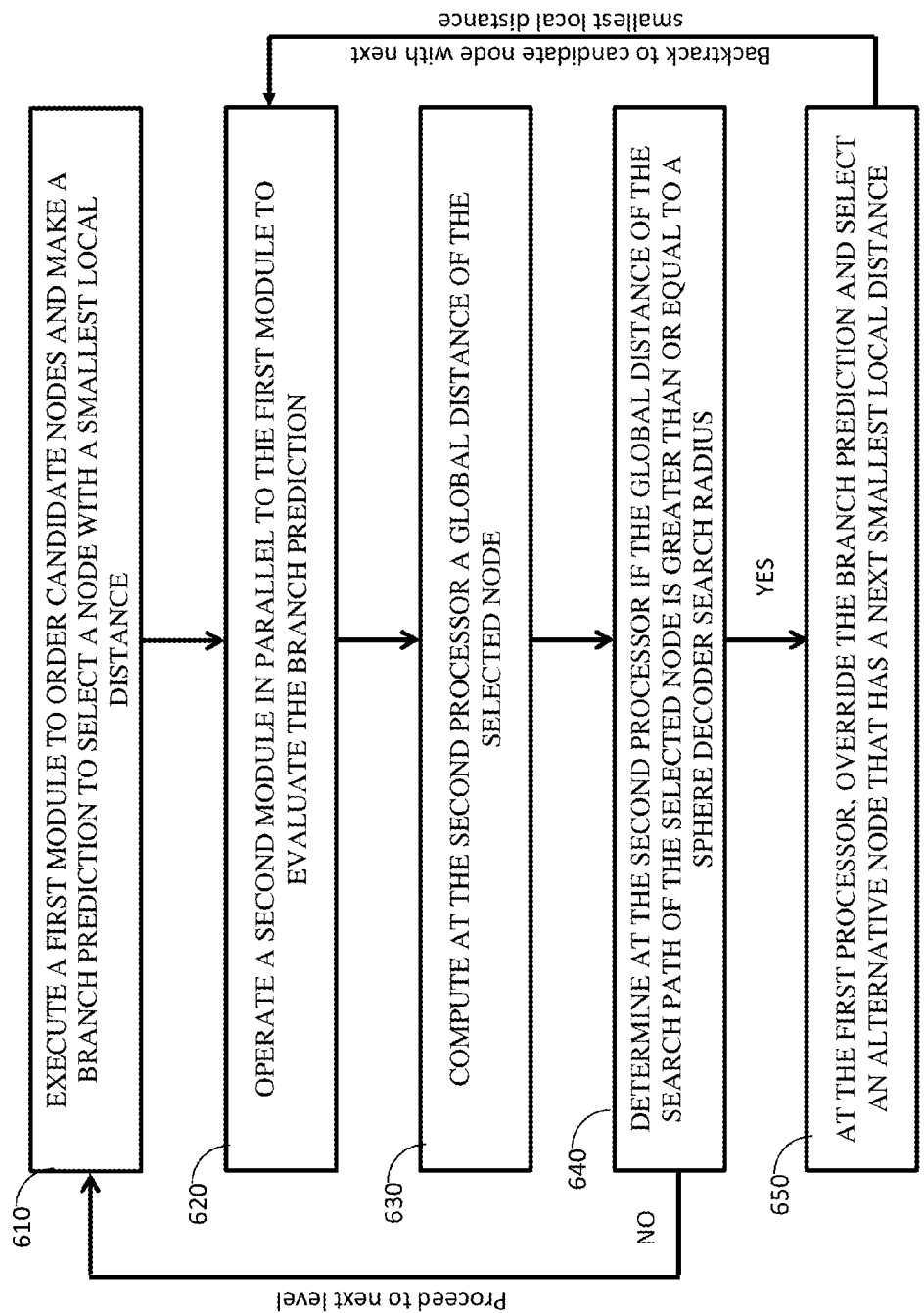
FIG. 6 is a flowchart of a method operating in accordance with an embodiment of the invention.

Reference is made to FIG. 6, which is a flowchart of a method operating in accordance with an embodiment of the invention. Operations 610-650 may be executed using the system shown in FIG. 1 or the hardware shown in FIG. 5.

In operation 610, a first module (e.g. branch prediction module 501 of FIG. 5) may execute a branch decision by selecting a node (e.g. node 304 of FIG. 3) of a tree graph (e.g. tree graph 300 of FIG. 3). At each juncture, the first module may compute a distance increment, $DI_i$, for each of a plurality of P candidate nodes (e.g. the distance from the i−1 level node or parent node to the current candidate i level node) and select the one of the P candidate nodes with a smallest distance increment. The first module may proceed iteratively through the tree graph to select a new node in each sequential cycle.

In operation 620, in parallel to operation 610, a second (e.g. confirmation module 502 of FIG. 5 and using separate hardware from the branch prediction module) may evaluate the branch predictions made in operation 610 by executing operations 630-650.

In operation 630, the second module may compute the global or accumulated distance of the selected node (e.g. by adding the distance increment for the node in each level of a search path from a root node to the selected candidate node), for example, by adding the current level's distance increment (e.g., the difference between the received signal and the transmitted signal corresponding to the selected node) to the previous level's accumulated distance (e.g. the distance increments accumulated for each node in a search path level-by-level from the root node to the parent node at the branch decision juncture).

In operation 640, the second module may compare the accumulated distance of the path of the selected node to a search radius, r.

If the accumulated distance is less than the search radius, the branch decision is correct and a process or processor may proceed to the next level to repeat operation 610 at the next branch node along the selected path. If the branch node is a leaf (final-level) node, the search radius may be updated to be the accumulated distance of the selected node.

However, if the accumulated distance is greater or equal than the search radius, the branch decision is incorrect and a process or processor may proceed to operation 650.

In operation 650, the first module may override the branch prediction, for example, pruning the selected node, and select an alternative candidate node with the next smallest local distance increment. A process or processor may backtrack to operation 620 to evaluate the alternative candidate node.

The process may proceed iteratively until a final node is evaluated.

Reference is made to FIGS. 7 and 8, which are graphs of experimental results of an example 4×4 MIMO decoder using 64 QAM in an LTE advanced communication system operating in accordance with an embodiment. FIG. 7 graphs the results of processing data in a relatively low-medium SNR range data (e.g. 15-20 dB) and FIG. 8 graphs the results of processing data in a relatively high SNR range data (25-30 dB). Each of FIGS. 7 and 8 show the results of processing approximately 12,000 tones of data. In the graphs of FIGS. 7 and 8, the x-axis represents the ratio between the number of incorrect predictions (penalty cycles where the node prediction is false) and the total runtime of the tone in cycles and the y-axis represents the number of tones with the above ratio of the x-axis.

FIG. 7 shows that for data in a low-medium SNR range, the mean ratio of penalty cycles is approximately 22% and FIG. 8 shows that for data in a high SNR range the mean ratio of penalty cycles is approximately 33%.

To compute the performance gain for such mean penalty ratios, each incorrect prediction event may incur a one cycle penalty, while the operating frequency of the search is doubled. The following parameters may be defined, for example, as follows:

2X=time or duration for performing a tree search according to conventional methods;

X=time or duration for performing a tree search according to embodiments of the invention (double the operation frequency of conventional methods); and False prediction ratio=proportion of penalty cycles from the total run time of a tone.

The performance gain may be for example:

$$\text{Performance gain} = 1 - \frac{X(1 + \text{flase prediction ratio})}{2X} = 1 - \frac{(1 + \text{flase prediction ratio})}{2}.$$

Considering the false prediction ratios for FIGS. 7 and 8, the performance gain may be calculated, for example, as follows:

For the low-medium SNR range data represented in FIG. 7, which has a mean ratio of penalty cycles of approximately 22%, the performance gain is, for example, $$1 - \frac{(1+0.22)}{2} = 0.39 = 39\% \text{ performance gain.}$$

For the high SNR range data represented in FIG. 8, which has a mean ratio of penalty cycles of approximately 33%, the performance gain is, for example, $$1 - \frac{(1+0.33)}{2} = 0.335 = 33.5\% \text{ performance gain.}$$

Figure 9:
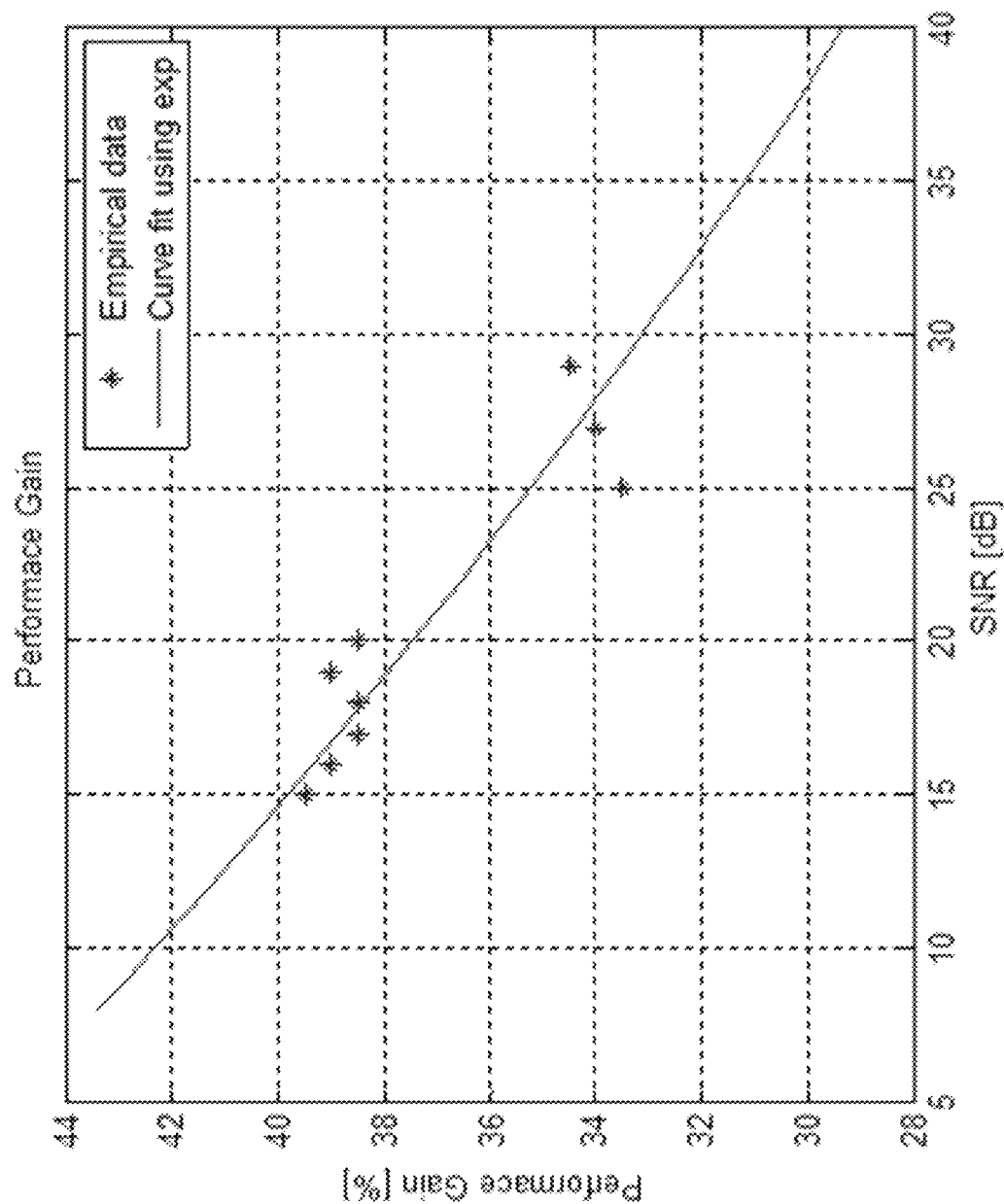
FIG. 9 is a graph plotting the relationship between performance gain and the SNR of the processed data in accordance with an embodiment of the invention.

Reference is made to FIG. 9, which is a graph plotting the relationship between performance gain and the SNR of the processed data in accordance with an embodiment of the invention. FIG. 9 shows that the relationship between the performance gain and the SNR is approximately linear, for example, such that, the improvement of search performance is directly proportional to the SNR of the data signal. According to some embodiments, a processor may activate the accelerator (so that the decoder runs the first and second modules in parallel) if the SNR of the signal data is above a threshold SNR, and may deactivate the accelerator (so that the decoder runs the first and second modules in series) if the SNR of the signal data is below a threshold SNR.

In accordance with any of the aforementioned embodiments of the invention, a branch tree decision may be divided into two phases, executed in parallel, to search a branch tree with up to double the speed of conventional systems that execute these phases in sequence.

Conventional sphere decoders may traverse a tree graph in search of the ML solution for a given data tone. Each chosen node lies along a path in the tree that has an accumulated distance that is compared against the tree radius. If the path distance exceeds the tree radius, the node may be pruned (discarded). The calculation of the accumulated distance and comparison to the tree radius typically make up the critical path of the conventional design, thereby limiting the speed of the ML decoder engine.

However, in biased trees where one node is statistically preferable over others, it is possible to choose a node by assuming that it is correct. The choice may later be checked and fixed if it turns out to be incorrect. The ML decoder engine operating according to the aforementioned embodiments of the invention may be executed in two parallel phases:

Phase 1: An optimal candidate node (contributing a minimal distance increment from the received signal) may be chosen and its path may be assumed to be smaller than the tree radius.

Phase 2: The node's accumulated distance may be calculated and compared one phase/cycle after the node is chosen:

For a correct prediction: In case the accumulated distance is smaller than the tree radius, the tree search continues.

For a false prediction: In case the accumulated distance is larger than the tree radius, a penalty cycle is incurred and a new next-smallest candidate node is chosen.

This implementation may double the clock speed of the ML decoder engine.

The performance improvement may be proportional to the tree bias, for example, depending on the number of correct vs. false predictions.

In accordance with the present invention and as used herein, the following terms are defined with the following meanings, unless explicitly stated otherwise.

Executed "in parallel" as used herein refers to executed concurrently, simultaneously, or during completely or partially overlapping time intervals. For example, a branch decision process may run in parallel (in overlapping time intervals) to a confirmation process even though the confirmation process is generally run at a time delay of one cycle relative to the branch decision process. For example, since the branch decision to select an i+1-level node occurs during the time when the confirmation process evaluates a prior i-level node, in parallel may refer to the simultaneously execution of the branch decision and confirmation processes in general, and/or in parallel may refer to processing a specific node at less than or equal to a one cycle delay. Further, in some embodiments, M cycles may be used to generate the initial search radius for an M-level tree. Accordingly, the confirmation process cannot begin until the search radius is initiated, causing a delay of M cycles for confirmation process relative to the branch prediction process. In such embodiments, in parallel may include staggered processing in which only the branch decision process runs for the first M cycles, after which the confirmation process initiates its processing at the same or overlapping times. Similarly, the final cycle of the tree search may include only a confirmation process and not a branch prediction process since the branch prediction process evaluates its final node one clock cycle before the confirmation process.

A "parent" or "child" node or level are relative terms as used herein that refer to a previous (i−1 th) and subsequent (i+1th) node or level, respectively, relative to the current (ith) node or level.

The maximum likelihood decoder (e.g., decoder 500 of FIG. 5) may be included in a receiving device in a MIMO system. The devices may include a mobile device or other user devices at the user or client end and a base station or network access point at the network end. User device or mobile device may include user equipment (UE), such as, a cell phone, smart phone, tablet or any device with wireless capability and able to communicate with a wireless access point, or another wireless capable device. Network device may include small cells, macro cells, base stations, radio access points, etc.

In accordance with any of the aforementioned embodiments of the invention, systems and methods may be software-implemented using dedicated instruction(s) or, alternatively, hardware-implemented using designated circuitry and/or logic arrays.

In accordance with any of the aforementioned embodiments of the invention, systems and methods may be executed using an article such as a computer or processor readable non-transitory storage medium, or a computer or processor storage medium, such as for example a memory (e.g. memory 503 of FIG. 5), a disk drive, or a USB flash memory, for encoding, including or storing instructions which when executed by a processor or controller (for example, module 501 and/or 502 of FIG. 5), carry out methods disclosed herein.

Different embodiments are disclosed herein. Features of certain embodiments may be combined with features of other embodiments; thus certain embodiments may be combinations of features of multiple embodiments.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method of decoding in a multiple-input-multiple-output (MIMO) system by searching a tree graph for a transmit signal $\bar{s}$ most likely to correspond to a received signal $\bar{y}$, the tree graph having a plurality of levels, each level having a plurality of nodes and each node representing a different value of an element of a candidate transmit signal $\bar{s}$, the method comprising:
   executing a branch prediction to select one of a plurality of ith level candidate nodes stemming from a previously selected i−1th level node that has a smallest distance increment between the received signal $\bar{y}$ and the transmit signal $\bar{s}$ variables represented by the selected one of a plurality of ith level candidate nodes;
   in parallel to the branch prediction, evaluating the selection of the i−1th level node by computing an accumulated distance of the i−1th level node by adding the smallest distance increments computed along a search path from a root node to the i−1th level node;
   and if the accumulated distance of the i−1th level node is greater than or equal to a search radius, overriding an i−2th level node from which the i−1th level node stemmed and selecting an alternative i−2th level or higher-level node that has an accumulated distance less than the search radius and has a next smallest distance increment.

2. The method of claim 1 comprising executing the branch prediction for the ith level node in a processor clock cycle and, in the same processor clock cycle, evaluating the i−1th level node predicted in a previous processor clock cycle.

3. The method of claim 1, wherein each selected node is evaluated at a one (1) cycle time delay from selecting the node.

4. The method of claim 1 comprising initializing the search radius to be a first accumulated distance adding distances for all levels in the tree graph and updating the search radius to be each subsequent accumulated distance adding distances for all levels in the tree graph that is smaller than the previously computed search radius.

5. The method of claim 1, wherein evaluating branch predictions is initiated after initializing the search radius.

6. The method of claim 1, wherein the tree graph has a number of levels, M, equal to the number of transmit antennae in the MIMO system and a number of candidate child nodes, P, stemming from each parent node of the tree graph equal to a modulation number used in a signal modulation.

7. The method of claim 1, wherein prior to selecting the candidate node that has the smallest distance increment, selecting a candidate node that satisfies a bias condition that the node is statistically more probable to be correct than the other candidate nodes.

8. The method of claim 7, wherein the branch predicting and evaluating processes are operated in parallel if the bias condition is satisfied and are operated in sequence if the bias condition is not satisfied.

9. The method of claim 8, wherein the method accelerates maximum likelihood decoding while providing near-maximum likelihood performance.

10. The method of claim 1, wherein the tree graph represents one tone of data defining all candidate transmit signals $\bar{s}$ for a received signal $\bar{y}$ received over a single channel.

11. A decoder for a MIMO system configured to implement the method of claim 1.

12. The decoder of claim 11, wherein the decoder is a maximum likelihood sphere decoder.

13. A multiple-input-multiple-output (MIMO) system configured to search a tree graph for a transmit signal $\bar{s}$ most likely to correspond to a received signal $\bar{y}$, the tree graph having a plurality of levels, each level having a plurality of nodes and each node representing a different value of an element of a candidate transmit signal $\bar{s}$, the system comprising a decoder configured to implement a method comprising:
   executing a branch prediction to select one of a plurality of ith level candidate nodes stemming from a previously selected i−1th level node that has a smallest distance increment between received signal $\bar{y}$ and transmit signal $\bar{s}$ variables represented by the selected one of a plurality of ith level candidate nodes;
   in parallel to the branch prediction, evaluating the selection of the i−1th level node by computing an accumulated distance of the i−1th level node by adding the smallest distance increments computed along a search path from a root node to the selected i−1th level node; and
   if the accumulated distance of the selected i−1th level node is greater than or equal to a search radius, overriding an i−2th level node from which the i−1th level node stemmed and selecting an alternative i−2th level or higher-level node has an accumulated distance less than the search radius and that has a next smallest distance increment.

14. A non-transitory computer readable medium comprising instructions which when implemented on one or more processors in a decoder of a multiple-input-multiple-output (MIMO) system cause the decoder to perform a method comprising:
   executing a branch prediction to select one of a plurality of ith level candidate nodes stemming from a previously selected i−1th level node that has a smallest distance increment between received signal $\bar{y}$ and transmit signal $\bar{s}$ variables represented by the selected one of a plurality of ith level candidate nodes;
   in parallel to the branch prediction, evaluating the selection of the i−1th level node by computing an accumulated distance of the i−1th level node by adding the smallest distance increments computed along a search path from a root node to the selected i−1th level node; and
   if the accumulated distance of the selected i−1th level node is greater than or equal to a search radius, overriding an i−2th level node from which the i−1th level node stemmed and selecting an alternative i−2th level or higher-level node has an accumulated distance less than the search radius and that has a next smallest distance increment.

15. The non-transitory computer readable medium of claim 14, wherein the method comprises executing the branch prediction for the ith level node in a processor clock cycle and, in the same processor clock cycle, evaluating the i−1th level node predicted in a previous processor clock cycle.

16. The non-transitory computer readable medium of claim 14, wherein the method comprising initializing the search radius to be a first accumulated distance adding distances for all levels in the tree graph and updating the search radius to be each subsequent accumulated distance adding distances for all levels in the tree graph that is smaller than the previously computed search radius.

17. The non-transitory computer readable medium of claim 14, wherein evaluating branch predictions is initiated after initializing the search radius.

18. The non-transitory computer readable medium of claim 14, wherein the tree graph has a number of levels, M, equal to the number of transmit antennae in the MIMO system and a number of candidate child nodes, P, stemming from each parent node of the tree graph equal to a modulation number used in a signal modulation.

19. The non-transitory computer readable medium of claim 14, wherein prior to selecting the candidate node that has the smallest distance increment, selecting a candidate node that satisfies a bias condition that the node is statistically more probable to be correct than the other candidate nodes.

20. The non-transitory computer readable medium of claim 14, wherein the tree graph represents one tone of data defining all candidate transmit signals $\bar{s}$ for a received signal $\bar{y}$ received over a single channel.

* * * * *